United States Patent [19]

Suwarnasarn

[11] Patent Number: 4,833,019
[45] Date of Patent: May 23, 1989

[54] MAGNETIC RECORDING TAPE COMPRISING A SUPPORT FILM HAVING A HIGH TRANSVERSE DIRECTION MODULUS

[75] Inventor: Nat J. Suwarnasarn, St. Paul, Minn.

[73] Assignee: Minnesota Mining and Manufacturing Company, St. Paul, Minn.

[21] Appl. No.: 14,987

[22] Filed: Feb. 17, 1987

[51] Int. Cl.⁴ .............................................. G11B 5/70
[52] U.S. Cl. .................................. 428/336; 427/128; 428/480; 428/694; 428/900
[58] Field of Search ............... 428/336, 480, 694, 900; 427/128

[56] References Cited

U.S. PATENT DOCUMENTS

| | | | |
|---|---|---|---|
| 4,187,341 | 2/1980 | Suzuki et al. | 427/128 |
| 4,316,927 | 2/1982 | Kimura et al. | 428/329 |
| 4,318,957 | 3/1982 | Videc | 428/480 |
| 4,546,030 | 10/1985 | Minami et al. | 428/694 |

Primary Examiner—Paul J. Thibodeau
Attorney, Agent, or Firm—Donald M. Sell; Walter N. Kirn; Warren R. Bovee

[57] ABSTRACT

The invention provides a magnetic recording tape having a substantial increase in electromagnetic and head cleaning capabilities comprising a thin magnetic layer carried on a non-magnetic support film, the film having a ratio of Young's modulus in the longitudinal direction to Young's modulus in the transverse direction sufficiently low, typically between about 0.3 and 0.5, to provide a tape with the improved properties.

10 Claims, 2 Drawing Sheets

MAGNETIC RECORDING TAPE COMPRISING A SUPPORT FILM HAVING A HIGH TRANSVERSE DIRECTION MODULUS

TECHNICAL FIELD

The present invention relates to magnetic recording media and particularly to magnetic recording tapes having support films with sufficient transverse direction modulus to exhibit improved electromagentic, head-cleaning, and head to tape interaction properties.

BACKGROUND

Magnetic recording media typically comprise a thin magnetic layer carried on a non-magnetic support. The magnetic layer typically comprises a magnetic pigment dispersed in a resinous binder or a magnetic coating deposited directly onto the non-magnetic support. Types of magnetic media include video tape, audio tape, diskette, computer tape, stretched surface media and many other configurations of a magnetic layer bound to a non-magnetic support. The present invention is particularly concerned with magnetic tapes, and most particularly with video tapes.

The magnetic recording process involves converting an electric signal current into an equivalent magnetization on a magnetic tape. This is done with a transducer, known in the art as a head, that transforms the electric signal into a magnetic field, through which a tape passes. The magnetic particles of the tape are then left with a remanence representative of the field which can be read by a head to reproduce the original signal. A typical video recorder uses a rotary head/drum assembly configuration known as a helical scanner.

The characteristics which relate to the ability of a tape to reproduce a signal precisely are referred to as its electromagnetic properties. The art continually strives for improving the electromagnetic properties of a tape. Previously, the art has concentrated on improving electromagnetics through improvements in the magnetic layer.

An additional desired property of a tape is its ability to keep deposits from building up on the head. In an effort to combat the problem of head build-up, the art has typically added head cleaning agents to the magnetic coating layer of the tape. Head cleaning agents are typically non-magnetic particles which have a higher degree of abrasivity than the magnetic coating layer.

It is desirable to provide a tape having substantially improved electromagnetic properties which utilizes presently known magnetic layers. It is further desired to provide a tape which exhibits improved head cleaning characteristics without additional head cleaning agents being added to the magnetic layer.

The present invention provides a tape which achieves greatly improved electromagnetics and head cleaning properties in a magnetic recording tape by utilizing a non-magnetic support film which has a very high Young's modulus in the transverse direction relative to the Young's modulus in the longitudinal direction.

The Young's modulus, or tensile modulus, of a film is a measure of the film's stiffness and is determined according to the standard method defined in ASTM D-882-11.7, extrapolated method. The tensile modulus is a ratio of the stress over strain in the initial linear portion of the stress-strain curve and is reported in $Kg/mm^2$. The tensile modulus is calculated by multiplying the force, extrapolated from the curve to 1% elongation, by 100 and dividing by the original (nominal) cross-sectional area of the sample.

For very narrow films, such as an audio or video tape, it is very difficult and inaccurate to measure tensile modulus in the above manner. Thus, the flexural modulus is measured and converted into tensile modulus. Tensile modulus and flexural modulus are related by a constant in the range of small deformations. The flexural modulus of a tape is determined according to the standard method defined in ASTM D790.71 and is a measure of the deflection of the center of the tape as a force is applied.

It has now been discovered that in a series of tapes in which the Young's modulus in the transverse direction is increased relative to the Young's modulus in the longitudinal direction a point is reached where it is believed a configurational change occurs in the tape as it moves over the head. This configurational change allows the tape to more closely approach or contact the center gap region of the head resulting in greatly improved electromagnetics and head cleaning action.

In U.S. Pat. No. 4,316,927, filed Feb. 2, 1979 ('927 patent), it is taught that a tape having a ratio of Young's modulus in the longitudinal direction to that in the transverse direction of between 0.5 and 0.9 provides a tape which exhibits improved head contact. The '927 patent further teaches that when this ratio is decreased below 0.5 to 0.4 the head contact is decreased, and thus, ratios of below 0.5 should be avoided (col. 6, lines 30-45). In contrast, the present inventors have discovered that as the ratio decreases to approximately 0.5 a configurational transformation occurs as the tape passes over the head and the electromagnetics of the tape improve substantially from a ratio of about 0.5 and continuing to a ratio of about 0.3. The '927 patent did not recognize this but instead teaches that a ratio of 0.5 is the minimum useful value.

Further, the present invention provides improved head cleaning properties. It is believed that prior art tapes have edge contact with the head leaving spacing between the center of the tape and the head gap. This allows deposits to collect and remain on the crucial gap portion of the head adversely affecting performance. The tape of the present invention provides contact between the tape and the center of the head, thereby providing cleaning action on the gap portion of the head.

In U.S. Pat. No. 4,318,957 ('957 patent), filed Dec. 26, 1978, carrier foils (non-magnetic support films) for magnetic tapes having Young's moduli higher in the transverse direction than in the longitudinal direction are described. The '957 patent teaches that these tapes are more resistant to buckling, folding, wrinkling, cupping and the like. These configurational phenomena are manifested as a tape passes over a pin or guide. The '957 patent teaches that the ratio of Young's modulus in the longitudinal direction to Young's modulus in the transverse direction should be less than 0.77 (inverse of the 1.3 actually recited in '957) and preferably less than 0.61 (inverse of 1.65 recited in '957). The '957 patent clearly does not teach or appreciate the surprising results obtained by the practice of the present invention which occur below a ratio of about 0.5 and continuing to a ratio of about 0.3.

DISCLOSURE OF THE INVENTION

The surprising and substantial increase in electromagnetic and head cleaning capabilities of a magnetic recording tape are achieved in the present invention by providing a magnetic recording tape comprising a thin magnetic layer carried on a non-magnetic support film, the film having a ratio of Young's modulus in the longitudinal direction (MLD) to Young's modulus in the transverse direction (MTD) sufficiently low to provide a tape which, when in use with a magnetic recording head maintains substantially steady state contact with the center region of a magnetic recording head (hereinafter referred to as center contact). Center contact is defined as the configuration of a tape as it rides over a head in which the tape is closest to the center region of the head. This configuration is opposed to an edge contact configuration in which as the tape rides over the head the tape is closest to the edges of the head.

It has been discovered that center contact can be achieved with a support film having a thickness of about 5 to 25 microns, a Young's modulus in the longitudinal direction (MLD) of at least 280 Kg/mm$^2$ and a ratio of the MLD to Young's modulus in the transverse direction (MTD) of between about 0.3 and 0.5. It is preferred that the ratio of MLD to MTD be between about 0.34 and 0.45. It is also preferred that the base film have a thickness of between about 8 and 16 microns.

To prevent breakage of the tape in use in a typical video recorder it is preferred that the MLD be greater than 350 Kg/mm$^2$ and more preferably greater than 420 Kg/mm$^2$.

The magnetic layer has a thickness of between about 0.005 and 10 microns. The magnetic layer preferably comprises a magnetic pigment dispersed in a resinous binder, and preferably has a thickness of between about 1.5 and 7.5 microns.

The magnetic layer typically has a MLD of between about 350 and 2800 Kg/mm$^2$, preferably between 700 and 2100 Kg/mm$^2$, and a MTD of between about 200 and 1500 Kg/mm$^2$, preferably between about 350 and 1100 Kg/mm$^2$.

DETAILED DESCRIPTION

Figure 1:
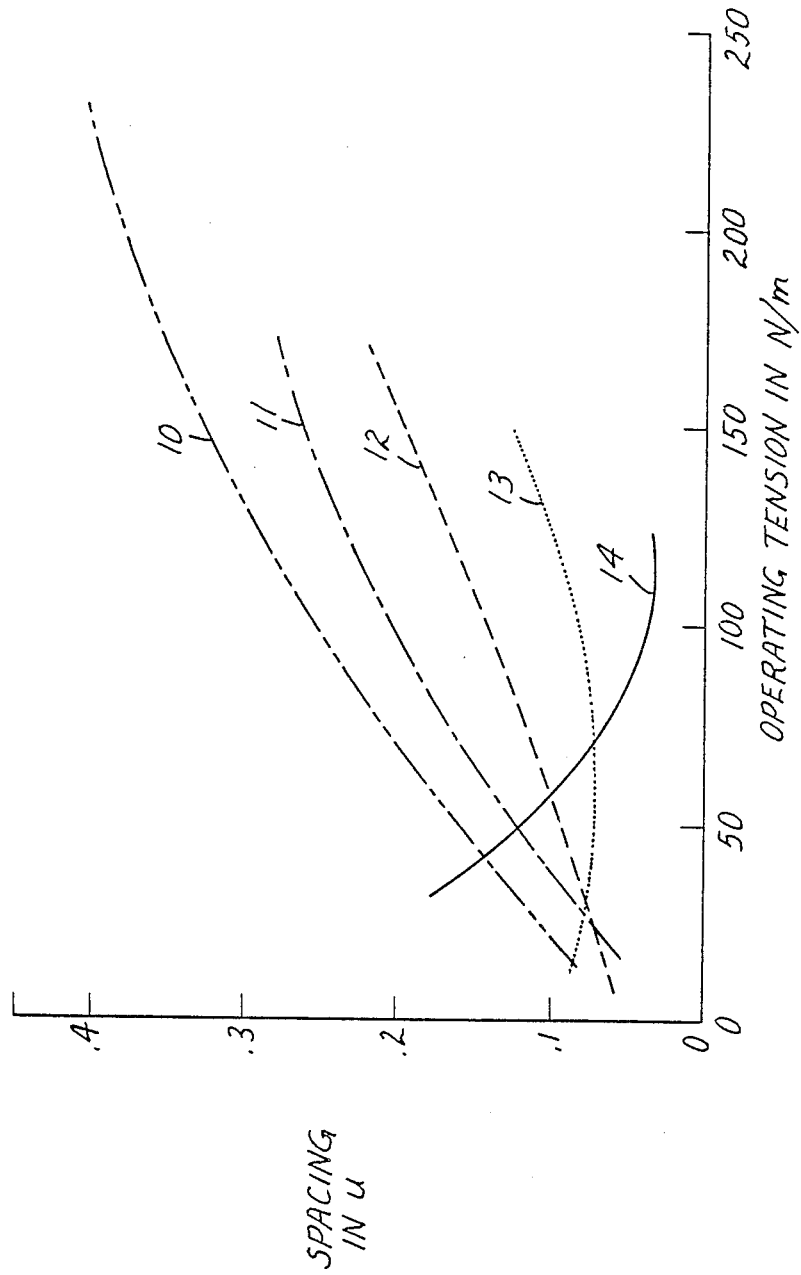
FIG. 1 is a graph of head to tape spacing versus operating tension for tapes having a range of support film thicknesses.
Figure 2:
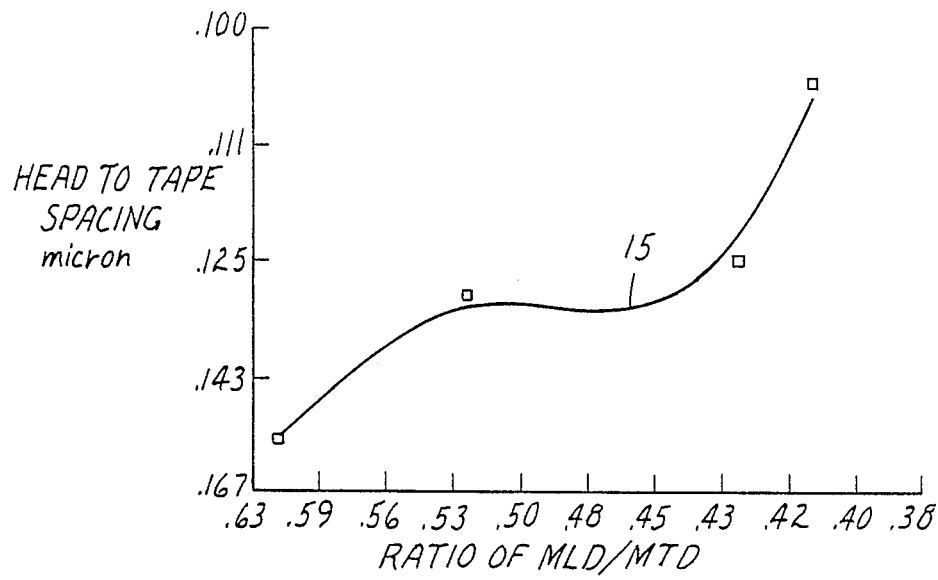
FIG. 2 is a graph of data from Table 1, plotting head to tape spacing versus the ratio of MLD/MTD.
Figure 3:
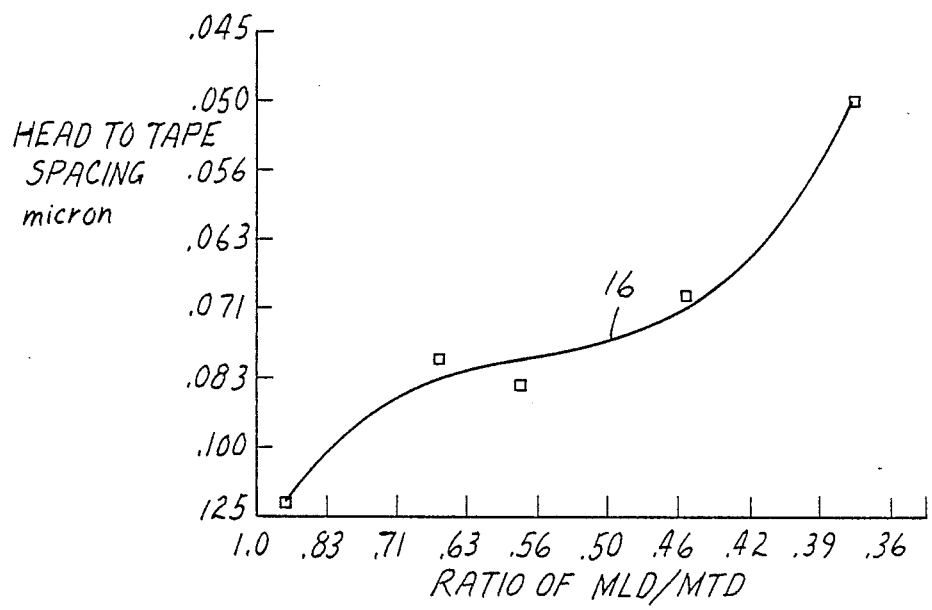
FIG. 3 is a graph of data from Table 2, plotting head to tape spacing versus the ratio of MLD/MTD.

The magnetic recording tape of the present invention is typically comprised of two layers, a magnetic layer carried on a non-magnetic support film. An optional backing layer may also be carried on the back side of the non-magnetic support film.

The magnetic layer is typically comprised of a dispersion of magnetic particles bound in a resinous binder. However, the magnetic layer may be a continuous metal layer which is directly coated onto the non-magnetic support through metal evaporation or sputtering techniques.

Examples of magnetic particles include cobalt absorbed gamma ferric oxide ($\gamma Fe_2O_3$), magnetic $Fe_3O_4$, cobalt doped, surface modified and adsorbed $Fe_3O_4$, $\gamma Fe_2O_3$bertholloid, $CrO_2$, Fe-Al-P alloy, Fe-Ni-Co alloy, Co-Ni alloy, Fe, Mn-Zn alloy, Fe-Ni-Zn alloy, Fe-Co-Ni-Cr alloy, Fe-Co-Ni-P alloy, chromium dioxide, barium ferrite, metal and metal alloy material and other suitable magnetic particles.

In addition to magnetic particles, non-magnetic particles such as alumina, titanium dioxide, dichromium trioxide, zinc oxide, and carbon black can also be dispersed in the binder.

Those binder materials usable in the magnetic layer of the magnetic recording medium of the present invention include thermoplastic resins, thermosetting resins, reactive-type resins, electron beam-setting resins and mixtures of these resins.

Thermoplastic resins conventionally used in the magnetic tape art can be used in the present invention. Generally these resins have a softening point less than 150° C., average molecular weight is from 10,000 to 200,000, and polymerization degree from about 200 to about 2,000. Representative examples include, vinylchloride-vinylacetate copolymers, vinyl chloride-vinylidene chloride copolymers, vinyl chloride-acrylonitrile copolymers, acrylate-acrylonitrile copolymers, acrylate-vinylidene chloride copolymers, methacrylate-vinylidene chloride copolymers, methacrylate-ethylene copolymers, urethane elastomers, polyvinyl fluoride, vinylidene chloride-acrylonitrile copolymers, acrylonitrile-butadiene copolymers, polyamide resins, polyvinylbutyral, cellulose derivatives (such as cellulose acetate-butyrate, cellulose diacetate, cellulose triacetate, cellulose propionate, nitrocellulose, etc.), styrene-butadiene copolymers, polyester resins, 2-chloroethyl-vinylether-acrylate copolymers, amino resins, various synthetic rubber-type thermoplastic resins, and mixtures of these resins In addition to the magnetizable particles, a dispersing agent and other conventional ancillary substances may be dissolved or dispersed in the binder, for example a lubricant. Useful lubricants are, for example, oleic acid, mineral oils, fatty acid amides, glycols, silicones, fatty acids, fatty acid esters, fluorine compounds and mixtures thereof. Dispersing agents include salts of triethanolamine, oleylamine or coconut fat amine with phosphoric acid esters, soya lecithin and many other varied dispersing agents.

The non-magnetic support film of the present invention may be formed of, for example, poly(ethylene terephthalate), polyphenylsulfide, and polyesters of aromatic dicarboxylic acids and ethylene glycol or 1,4 cyclohexane dimethanol. Preferred are polyesters in which either terephthalic acid or 2,6-naphthalene dicarboxylic acid constitutes the predominant dicarboxylic acid with poly(ethyleneterephthalate) most preferred.

A film having the desired ratio of MLD to MTD may be prepared by, for example, methods disclosed in U.S. Pat. Nos. 4,226,826 and 4,497,865.

The base film typically has a thickness of about 5 to 25 microns, with the preferred range being from about 8 to about 16 microns. The present invention is not typically applicable to the use of very thick films, e.g. films greater than 30 microns. It has been found that head to media spacing, defined as the distance between the center of the head and the tape during use, decreases as the tape thickness increases. Thus, a sufficiently thick tape will ride sufficiently flat and close to the head so that the teachings of the present inventions will have little applicability. (See FIG. I)

However, the use of a thick tape is not practical for commercial use. The thicker the tape the shorter the length of tape that can be wound in a particular size roll. The trend in the art has been the use of thinner and thinner support films, usually less than 20 microns and preferably less than 10 microns. It is with the thinner tapes that the present invention is particularly useful.

FIG. I shows the relationship between the thickness of the tape and head to tape spacing. As the tape gets thinner, spacing increases. Spacing also typically increases with operating tension in the longitudinal direction. Typical video recorders operate with a tension of between 70 to 110N/M.

Referring to FIG. 1, there is shown a graph of head to tape spacing versus operating tension in N/M. Tape 10 is a tape with a 9μ backing; Tape 11 is a tape with a 10μ backing; Tape 12 is a tape with a 12μ backing; Tape 13 is a tape with a 14μ backing; and Tape 14 is a tape with a 20μ backing. As FIG. 1 shows, spacing generally increases with increased tension and decreased thickness of the tape backing.

The MLD should be greater than 280 Kg/mm$^2$ to prevent breakage or deformation of the tape during use. More preferably the MLD is greater than 350 Kg/mm$^2$ and most preferably greater than 420 Kg/mm$^2$.

The MTD of the base film should be sufficient to provide a tape which when moved longitudinally across the face of a radiused magnetic recording head maintains center contact with the center gap region of the magnetic recording head. A typical recording head has a radius of curvature between 1.61 and 3.2, typically about 2.3 mm. Typical relative read/write speeds are between about 0.5 m/s and 50 m/s.

It has been found that a series of tapes, in which the film ratio of MLD to MTD is lowered from a starting point of 0.9, will exhibit a transition from an edge contact configuration with the head to a center contact configuration as the ratio is brought below about 0.5. It is desirable to keep this ratio (MLD/MTD) above about 0.3. The preferred range of the ratio (MLD/MTD) is between about 0.34 and 0.45. The preferred ranges are believed to encompass the ratios which provide tapes with minimum head to media spacing, and optimum electromagnetics and head cleaning properties. (See FIGS. II and III)

The problem of edge contact is particularly acute when the radius of the head is greater than about 2.2 mm. Even if a new head has a radius of less than 2.2, the radius will increase with use as the head becomes worn. A typical head has been found to experience an increase in radius of from about 2.2 to greater than 6 with 2800 hours of use with a typical commercially available tape of average abrasivity.

The magnetic layer typically has a thickness of between about 0.005 and 10 microns. Thin magnetic layers are generally ferromagnetic metals or alloys directly coated onto a non-magnetic support through evaporation or sputtering procedures. Thicker magnetic layers are typically comprised of a magnetic pigment dispersed in a resinous binder. The preferred range of these magnetic layers is between about 1.5 and 7.5 microns. The surface roughness of the magnetic layer is generally between about 3 nm and 17 nm, RMS.

The thickness of the nonmagnetic film is typically much greater than the thickness of the magnetic layer and as such the tensile modulus of the base film dominates the physical performance characteristics of the tape. The greater thickness coupled with the difficulties in obtaining a magnetic layer having a substantially higher MTD than MLD make the moduli of the support film of critical importance.

Typically, a magnetic layer having acicular particles has a MLD of between about 350 and 2800 Kg/mm$^2$, preferably between about 700 and 2100 Kg/mm$^2$, and a MTD of between about 200 and 1400 Kg/mm$^2$ preferably between about 300 and 1100 Kg/mm$^2$. Metal evaporated coatings are extremely thin and have moduli in each direction of about 140 to 700 Kg/mm$^2$. Magnetic layers comprising non-acicular particles in a binder have moduli in each direction of about 140 to 1400 Kg/mm$^2$:

The tapes of the present invention as described above exhibit the following improved characteristics: (1) improved signal/noise response; (2) increased head cleaning effectiveness or abrasivity without increasing the concentration of head cleaning agent; (3) reduced rub noise; (4) decreased head to tape spacing overall, particularly at the gap located at the head center; and (5) increased durability as measured by the stop motion time before failure.

Industry standards typically define an acceptable S/N degradation of up to −3 dB (decibels) after 6 hrs of play. Rub noise should be close to zero. Dropouts should be below 50 dropout counts measured at −15 dB for 10 micro seconds. RF output should be greater than −2.5 dB. Dropouts are caused by depressions or asperities in the tape which cause a sudden increase in head/media spacing and result in a loss of signal.

Minimum theoretical head-to-media spacing is equal to the average of the summation of the peak to valley surface roughness of the tape plus that of the recording head. In other words, the closest a tape can ride to a head is the average of the asperities on the tape plus the average of the asperities on the head. Industry standards do not presently exist. It is believed that prior to the present invention it was not possible to approach minimum theoretical spacing.

The invention is further described by the following non-limiting examples.

EXAMPLES 1-4

Magnetic tapes were prepared using polyethylene terephthalate films of about 9.83 microns thickness having the longitudinal (MLD) and transverse (MTD) direction Young's moduli as are described in Table 1.

The polyethylene terephthalate films (hereinafter PET) were prepared in a melt extruder at about 290° C. and then cooled rapidly to room temperature to obtain a substantially amorphous sheet. The films were stretched in the longitudinal direction at a temperature in the range of 85°-90° C. and with a draw ratio of 3.2 times by passing through a set of rollers traveling at different speeds. The films were stretched in the transverse direction at a temperature in the range of 95°-100° C. with a draw ratio ranging from 3.1 to 5.4 times by use of a tenter frame.

The films were stretched a second time at a temperature of between 220° and 240° C. with a draw ratio of between 1.09 and 1.15 in a tenter frame. The $T_g$ of PET is 75° and the $T_m$ is 256° C.

A magnetizable layer of about 5.2 microns thickness having an average coating modulus of 1000 Kg/mm$^2$ and a carbon containing backside layer were then applied to opposite sides of the film, resulting in magnetic tapes of about 15.11 microns thickness and about 8.0 nanometer RMS surface roughness. Surface roughness was measured using the technique described in the article by D. M. Perry, "Three dimension surface metrology of magnetic recording materials through directphase-detecting microscopic interferometry", *Journal of the Institution of Electric and Radio Engineering* Vol. 55, No. 4, pp. 145-150, April 1985. These tapes were tested for head/tape spacing gap using a stroboscopic, white-light interferometer. The electro magnetic measurements were made on a commercially available Video cassette recorder. The signal from the video head was allowed to proceed to the preamplifier/mixer, where the signal from the various heads was combined. Next, the signal proceeded into an Rf amplifier, and was then available for Rf output, S/N and dropout counting. The data are described below in Table 1.

TABLE 1

|  | Example | | | |
| --- | --- | --- | --- | --- |
|  | 1 | 2 | 3 | 4 |
| Film MTD (Kg/mm$^2$) | 703 | 844 | 907 | 984 |
| Film MLD/MTD | 0.61 | 0.52 | 0.43 | 0.41 |
| Tape MTD (Kg/mm$^2$) | 429 | 506 | 500 | 527 |
| Tape MLD/MTD | 1.05 | 0.96 | 0.86 | 0.89 |
| Spacing (Micron) | 0.155 | 0.130 | 0.125 | 0.105 |
| RF Output (db) | −1.1 | −0.4 | 0.0 | 0.4 |
| Dropouts/Min. | 128 | 84 | 76 | 58 |

EXAMPLES 5-9

Magnetic tapes for Examples 5-9 were prepared and tested as described above using film having a thickness of 12.8 microns and the results are set forth in Table 2.

TABLE 2

|  | Example | | | | |
| --- | --- | --- | --- | --- | --- |
|  | 5 | 6 | 7 | 8 | 9 |
| Film MTD (Kg/mm$^2$) | 471 | 626 | 844 | 844 | 949 |
| Film MLD/MTD | 0.93 | 0.66 | 0.57 | 0.45 | 0.37 |
| Tape MTD (Kg/mm$^2$) | 345 | 429 | 464 | 478 | 492 |
| Tape MLD/MTD | 1.33 | 1.11 | 0.98 | 0.93 | 0.90 |
| Spacing (Micron) | 0.12 | 0.08 | 0.085 | 0.07 | 0.05 |
| RF Output (db) | −1.1 | −0.15 | 0.0 | 0.4 | 1.2 |
| Dropouts/Min. | 22 | 15 | 15 | 6 | 14 |

The film ratio of MLD/MTD from Tables 1 and 2 were plotted in the graphs of FIGS. II and III, respectively. FIG. II has a line 15, which represents the plot of head to tape spacing versus the ratio of MLD/MTD using the data from Table 1. FIG. III has a line 16, which represents the plot of head to tape spacing versus the ratio of MLD/MTD using the data from Table 2. From the graphs of FIGS. II and III it is evident that head to media spacing decreases at a relatively steady rate as the ratio of MLD/MTD is decreased. A plateau region is reached where the rate of decrease of head to media spacing drastically slows relative to a continued decrease in the MLD/MTD ratio. It is believed that this plateau region represents the region of configurational change, from an edge contact configuration to a center contact configuration. After the plateau region, the rate of improvement in head to media spacing with decrease of MLD/MTD ratio increases at a substantially greater rate than prior to the plateau region.

What is claimed is:

1. A magnetic recording tape comprising: a magnetic layer carried on a non-magnetic support film, said support film having a thickness of between about 5 and 25 microns, a Young's modulus in the longitudinal direction of at least 350 Kg/mm$^2$ and a ratio of Young's modulus in the longitudinal direction of Young's modulus in the transverse direction of between about 0.3 and about 0.45.

2. The magnetic recording tape of claim 1 wherein said support film has a ratio of Young's modulus in the longitudinal direction to Young's modulus in the transverse direction is between about 0.34 and 0.45.

3. The magnetic recording tape of claim 1 wherein said support film has a thickness of between about 8 and 16 microns.

4. The magnetic recording tape of claim 1, wherein said Young's modulus in the longitudinal direction is at least 430 kg/mm$^2$.

5. The magnetic recording tape of claim 1 wherein said magnetic layer has a thickness of between about 0.005 and 10 microns.

6. The magnetic recording tape of claim 5 wherein said magnetic layer comprises a magnetic pigment dispersed in a resinous binder.

7. The magnetic recording tape of claim 6 wherein said magnetic layer has a thickness of between about 1.5 and 7.5 microns.

8. The magnetic recording tape of claim 1 wherein said magnetic layer has a Young's modulus in the longitudinal direction of between about 350 and 2800 Kg/mm$^2$ and a Young's modulus in the transverse direction of between about 200 and 1500 Kg/mm$^2$.

9. The magnetic recording tape of claim 8 wherein said magnetic layer has a Young's modulus in the longitudinal direction of between about 700 and 2100 Kg/mm$^2$ and a Young's modulus in the transverse direction of between about 350 and 1100 Kg/mm$^2$.

10. A non-magnetic film having a thickness of between about 5 and 25 microns, a Young's modulus in the longitudinal direction of at least 350 Kg/mm$^2$ and a ratio of Young's modulus in the longitudinal direction to Young's modulus in the transverse direction of between about 0.3 and about 0.45.

* * * * *

UNITED STATES PATENT AND TRADEMARK OFFICE
CERTIFICATE OF CORRECTION

PATENT NO. : 4,833,019

DATED : May 23, 1989

INVENTOR(S) : Suwarnasarn et al

It is certified that error appears in the above-identified patent and that said Letters Patent is hereby corrected as shown below:

Title page, Item [75]: Alvin M. Berg, St. Paul, Minn., should be added as a joint inventor.

Column 3, line 66, after "$CRO_2$," insert --Fe-Al alloy--.

Signed and Sealed this

Sixth Day of February, 1990

Attest:

JEFFREY M. SAMUELS

*Attesting Officer*     *Acting Commissioner of Patents and Trademarks*